United States Patent [19]

Baumgartner

[11] 4,437,386
[45] Mar. 20, 1984

[54] PNEUMATICALLY OPERATED SERVO-MOTOR AND CONTROL METHOD THEREFOR

[75] Inventor: Hans Baumgartner, Viersen, Fed. Rep. of Germany

[73] Assignee: Pierburg GmbH & Co., KG, Neuss, Fed. Rep. of Germany

[21] Appl. No.: 393,301

[22] Filed: Jun. 29, 1982

[30] Foreign Application Priority Data

Jul. 18, 1981 [DE] Fed. Rep. of Germany ....... 3128486

[51] Int. Cl.$^3$ .............................................. F15B 9/03
[52] U.S. Cl. .................................. 91/363 R; 91/454; 91/459
[58] Field of Search ...................... 91/361, 362, 363 R, 91/363 A, 454, 457, 459; 123/382; 92/5 R

[56] References Cited

U.S. PATENT DOCUMENTS

| | | | |
|---|---|---|---|
| 2,939,430 | 6/1960 | Westbury | 91/363 R |
| 3,295,421 | 1/1967 | McCormick | 91/457 |
| 3,455,411 | 7/1969 | Carp et al. | 123/352 |
| 3,727,517 | 4/1973 | Slavin et al. | 91/361 |
| 4,210,228 | 7/1980 | Vaarala | 92/5 R |
| 4,358,989 | 11/1982 | Tordenmalm | 91/361 |
| 4,366,743 | 1/1983 | Leszczewski | 91/363 R |

Primary Examiner—Robert E. Garrett
Assistant Examiner—H. Edward Li
Attorney, Agent, or Firm—Toren, McGeady and Stanger

[57] ABSTRACT

A method of controlling a pneumatically operated servo-motor (1) having a linearly movable operating rod (6) is described in which the actual position of the operating rod is monitored continuously during each stroke, and when the rod reaches a position which lies a predetermined amount in front of a limit position reached during the preceding stroke the speed at which the operating rod travels towards the corresponding limit position of the current stroke is modified. In particular the method is used in a clutch actuating servo-motor to brake the speed of the operating rod at a position which corresponds to the initial contact between the clutch friction surfaces when the rod is moving to engage the clutch, so that the free travel of the clutch is taken up as quickly as possible, but the actual engagement is slowed in order to avoid undesirable jerkiness and wear. For this purpose a servo-motor (1) is provided with an electrical pick-up (18) which is mounted on an extension member (20a) of the operating rod (6) so that the pick-up (18) follows faithfully the linear motion of the operating rod. The pick-up (18) is in sliding contact with a ribbon potentiometer (16) by which an electrical signal corresponding to the actual position of the operating rod at any time may be obtained. An electrical signal corresponding to the limit position of the operating rod (6) for use in controlling the next stroke is also derived, either from the pick-up (18) or alternatively from a separate pick-up (19) co-operating with a further ribbon potentiometer (17), the pick-up (19) being arranged to move only in response to a change in the limit position from one stroke to the next.

11 Claims, 4 Drawing Figures

PNEUMATICALLY OPERATED SERVO-MOTOR AND CONTROL METHOD THEREFOR

This invention relates to a method of controlling a pneumatically operated servo-motor having an operating rod with a substantially linear stroke, and to a servo-motor with which the method can be performed.

In motor vehicles and other motor-driven machines, it is becoming increasingly common to control actuating devices by electrical or electronic switching circuits, even in the case of devices which need high actuating energy such as a clutch actuating servo-motor. For example, it is known to operate a vehicle clutch by means of an externally originating force provided by a vacuum-actuated servo-motor, and to control the operation by an electronic switching circuit which acts upon solenoid valves to connect the pneumatic working chamber of the servo-motor with a vacuum source and with atmosphere alternately as a function of the electronic control signals, thereby so influencing the pressure and stroke state of the servo-motor that the desired slip values occur at the clutch.

In such pneumatically operated servo-motors, the movement of the operating rod takes place rapidly and directly, so that when actuating a clutch the engagement of the clutch takes place extraordinarily sharply. This results in increased clutch wear, and is particularly noticeable when the clutch is operated in conjunction with a so-called inertia utilization system. In such system in internal combustion engines, the crankshaft of the engine is disengaged from the engine flywheel by easing the cluch, in order to attain an immediate stopping of the engine, when the operating conditions do not require any power output from the engine, such as during overrunning or idling. When it is necessary for the engine to be re-started, the clutch is engaged to reconnect the continually running flywheel to the crankshaft, and in the case of a jerky clutch engagement increased engine wear would result due to the high acceleration to which the engine components are subjected during restarting. It is therefore desirable that the clutch be engaged as rapidly as possible, but nevertheless softly so as to lessen the engine loading.

For this purpose it has already been proposed that the closing of the clutch air gap may be increased to the maximum possible take-up velocity by the servo-motor being loaded for this working phase with pneumatic gas additional to that of normal operation by means of an additional mechanical valve, and that, when the clutch friction surfaces touch, the flow cross-section of this additional valve may be drastically reduced as a function of the position of the operating rod so that the further clutch engagement takes place at a reduced velocity, as a result of reduced pressure in the servo-motor. However, this proposal has the disadvantage that the stroke position at which the change-over from a large to a reduced pneumatic gas flow takes place is a fixed setting, and therefore, when clutch wear occurs, contact of the clutch friction surfaces will not occur until after the reduction of the actuating velocity. Frequent re-adjustment of the switching point would therefore be necessary for rational operation of this device.

With the aim of overcoming this problem, according to the present invention a method of controlling a pneumatically operated servo-motor having an operating rod with a substantially linear stroke comprises monitoring continuously the actual position of the operating rod during each stroke, and modifying the speed at which the operating rod travels towards a limit position of the stroke during each stroke from a position of the rod which lies a predetermined amount in front of the limit position reached during the preceding stroke.

According to another aspect of the invention a pneumatically operated servo-motor which has an operating rod with a substantially linear stroke and which can be controlled by this method comprises a device for continuously monitoring the actual position of the operating rod during each stroke and including a pick-up mounted to move with movement of the operating rod, means for recording a limit position reached by the operating rod in each stroke, and means for modifying during each stroke the speed at which the operating rod travels towards the limit position commencing from a position of the rod which lies a predetermined amount in front of the limit position reached during the preceding stroke.

The invention provides a way in which the optimum position for commencing the desired modification of the operating rod velocity during each stroke can be set and maintained from stroke to stroke by automatic adjustment as necessary. No manual re-setting is necessary. In particular, the servo-motor in accordance with the invention can be used to actuate a clutch so that the initial movement to engage the clutch takes place as rapidly as possible, and from a predetermined position which is set automatically for each actuation the movement is slowed for completion of the engagement.

The monitoring of the actual position of the operating rod during each stroke may be carried out mechanically or electrically either directly from the operating rod or from a member which is moved by the rod. Likewise, the recording of the limit position of each stroke is possible either mechanically or electrically.

The change in the velocity of the operating rod is effected by varying the quantity of air which flows per unit time in or out of the pneumatic working chamber of the servo-motor. Such servo-motors are usually operated in one working direction by connecting a vacuum or excess pressure to the working chamber, while movement in the opposite direction is produced by connecting the chamber to atmosphere, although a connection with a pneumatic pressure source at a different pressure level may be effected for this purpose.

The difference between the limit position reached by the operating rod of the servo-motor in each stroke and the position of the rod from which its velocity is changed during the next stroke is predetermined, and can be set as desired. In the case of clutch actuation by the servo-motor, this difference is preferably set to the distance of travel between the first contact of the clutch friction surfaces and the limiting position of these surfaces.

Preferably, the actual position of the operating rod is monitored by a first pick-up which moves with movement of the rod, and the limit position of the stroke is monitored by a second pick-up which moves in response to a change in the limit position from one stroke to the next, and the position from which the velocity of the operating rod is modified during each stroke corresponds to a fixed difference between the positions of the two pick-ups.

The second pick-up for monitoring the limit position may comprise a support which is self-securing, but is nevertheless displaceably mounted, on a fixed part. This support has, in the limit position of the stroke in the axial direction, contact with a fixed component mounted on the servo-motor or the device to be actuated, and preferably this component is adjustable in the axial direction so that the difference between the positions of the two pick-ups may be adjusted. The displacement capability of the support enables its position relative to the stroke rod to be changed as soon as the limit position changes.

The first pick-up for monitoring the actual position of the operating rod during each stroke may comprise a support mounted and fixed on the operating rod or a member which moves with this rod and makes possible an electrical or mechanical reading as a function of the current rod position. This support may be constructed so that it can be fixed in different positions on the stroke rod, and in this way a further possibility is provided for basically predetermining the fixed difference value between the positions of the two pick-ups. Such an arrangement renders possible a particularly simple way of carrying out of the method of the invention, and simplifies the production of the necessary apparatus. Also, the subsequent installation of appropriate conversion components in existing servo-motors to enable them to use the method in accordance with the invention may be done in a simple manner.

In particular, when the monitoring of the rod position is carried out electrically, it is preferred that the limit position reached by the rod in each stroke is recorded by means of an electrical voltage signal which corresponds to the limit position and which is stored by a signal holding circuit for the next stroke. This electrical type of storage avoids the use of a mechanical device for establishing changes in the limit position on each stroke, and thus a component which has to be moved. This is an advantage, particularly when changes of the limit position take place slowly and over a fairly long period, since displaceable self-holding components can jam due to corrosion or dirt accumulation. A further advantage lies in the fact that changes in the limit position of the stroke can be detected in both directions without difficulty, and there is therefore no restriction to a unidirectional change in the limit position due to wear. Finally, the arrangement improves the easy running of the entire apparatus on account of the lack of additional components subject to frictional stress.

Preferably the velocity of the operating rod is modified by cyclically pressure-loading the pneumatic chamber of the servo-motor. This is useful when the pneumatic chamber is controlled by at least one electromagnetic valve which has only open and closed settings and does not possess any intermediate flow regulating setting. In the open setting, the air flows into or out of the chamber at maximum possible velocity. With cyclical operation the valve travels towards its open and closed positions at predetermined time intervals, so that on average a slower flow velocity of the air, and thus a slower operating speed of the servo-motor, results. With this arrangement the ratio of the opening and closing times of the control valve or valves may be varied as a function of the degree of proximity of the operating rod to the limit position reached during the preceding stroke. As a result the actuating velocity can be changed accordingly to any desired predetermined time programme, and in particular the valves are preferably controlled so that the velocity of the operating rod is modified by initially reducing it to a predetermined minimum value and then again increasing it with increasing proximity of the rod to the limit position. This arrangement is particularly recommended for clutch actuation since it makes possible an especially soft and jerk-free engagement, but at maximum possible speed since the operating velocity of the servo-motor is braked only at the instant which is decisive for avoiding jerks.

As mentioned previously the position of the operating rod may be monitored during each stroke mechanically or electrically. In the former case the pick-up may take the form of a toothed rack, and in the latter case, which is preferred, the monitor may comprise a ribbon potentiometer which is disposed parallel to the axial direction of the stroke and which has its slider formed by the pick-up which moves with the operating rod.

Examples of the method and apparatus in accordance with the present invention will now be described with reference to the accompanying drawings, in which.

Figure 1:
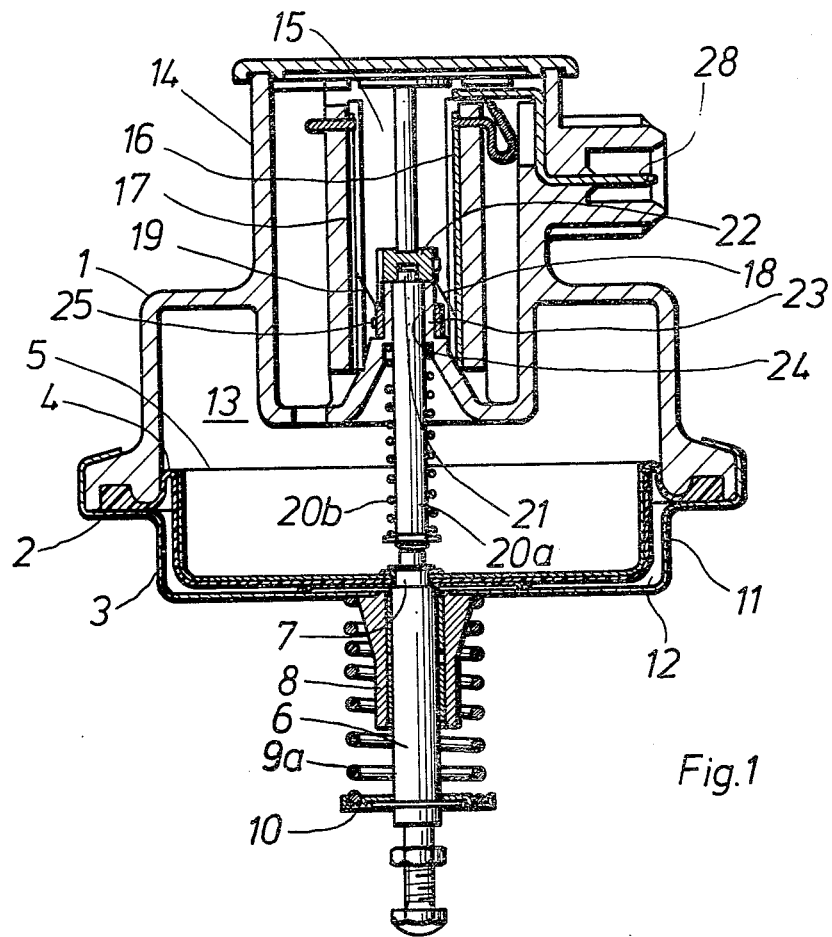
FIG. 1 is a longitudinal section through one example of a pneumatically operated servo-motor embodying the invention.

In FIG. 1, a pneumatically operated servo-motor is shown comprising a casing 1 and a casing cover 3 which clamps between it and the casing a seal 2 and the periphery of a diaphragm (roll diaphragm) 4 having a central stiffening plate 5. An operating rod 6 of the servo-motor passes through a central aperture 7 in the casing cover 3 and is originally connected to the diaphragm 4 and its stiffening plate 5. A collar 8 mounted on the casing cover 3 provides an axial guide for the operating rod 6. A spring 9a acting between the casing cover 3 and a shoulder 10 on the operating rod 6 biasses the latter towards a position extended out from the casing 1 as shown and which represents the unloaded state of the servo-motor. An opening or valve 11 in the casing cover 3 connects the space 12 formed between the diaphragm 4 and the casing cover 3 with the surrounding atmosphere. The space enclosed between the casing 1 and the diaphragm 4 forms the pneumatic working chamber 13 of the servo-motor and is arranged to be connected to suitable air pressure sources for operating the servo-motor through one or more conventionally known control valves (not illustrated). In the present example the servo-motor is actuated by air at a lower pressure than the ambient pressure causing the diaphragm 4 to move and draw with it the operating rod 6 against the action of the spring 9a.

The casing 1 of the servo-motor is formed integrally with a housing 14 for a device 15 for monitoring the positin of the operating rod 6 at any time. In the present example this monitoring device 15 comprises an electrically conducting strip 16 extending parallel to the stroke direction of the operating rod 6, and a similarly extending electrically conducting strip 17, although this strip 17 may be omitted in some examples. In addition the device 15 comprises a pair of pick-ups 18 and 19 which contact the strips 16 and 17 respectively.

The pick-up 18 is carried by a mounting 22 fitted on the end 21 of a plunger 20a which extends into the housing 14 from the chamber 13 through a bore 24 formed by a collar portion 23 of the casing 1, and which is axially aligned and in contact with the operating rod 6 at its end adjacent the diaphragm 4. The plunger 20a is surrounded by a spring 20b which acts between the casing 1 and the end of the plunger near the operating rod 6 to bias the plunger against the stiffening cover 5 or the end of the operating rod 6 without clearance. Alternatively the plunger 20a may be rigidly fixed relative to the operating rod 6. In either case the plunger 20a will move simultaneously and in correspondence with the operating rod 6 and the pick-up 18 will follow the movement of the rod.

Figure 2:
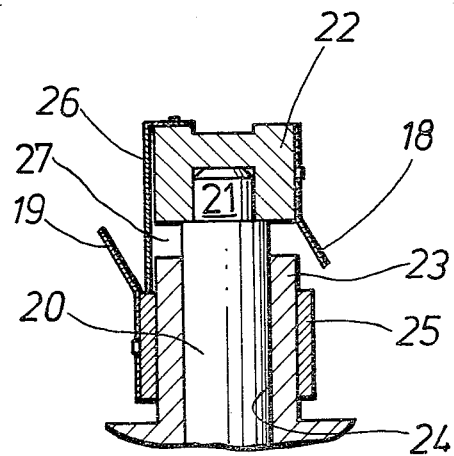
FIG. 2 is an enlarged sectional view of a part of the servo-motor shown in FIG. 1.

The pick-up 19 is carried by a slip ring 25 which is self-holding but axially displaceable on the outside of the collar 23. A stirrup 26 on the mounting 22 engages the slip ring 25 in the rest position of the servo-motor as shown and thus pushes the ring and its pick-up 19 into a position which corresponds to the current limit position of the operating rod 6. As will be seen from FIG. 2, a gap 27 between the mounting 22 and the collar 23, and also the collar length, are so dimensioned that the ring 25 and the pick-up 19 can be displaced to follow changes in the limit position up to an extreme limit position of the operating rod.

Figure 4:
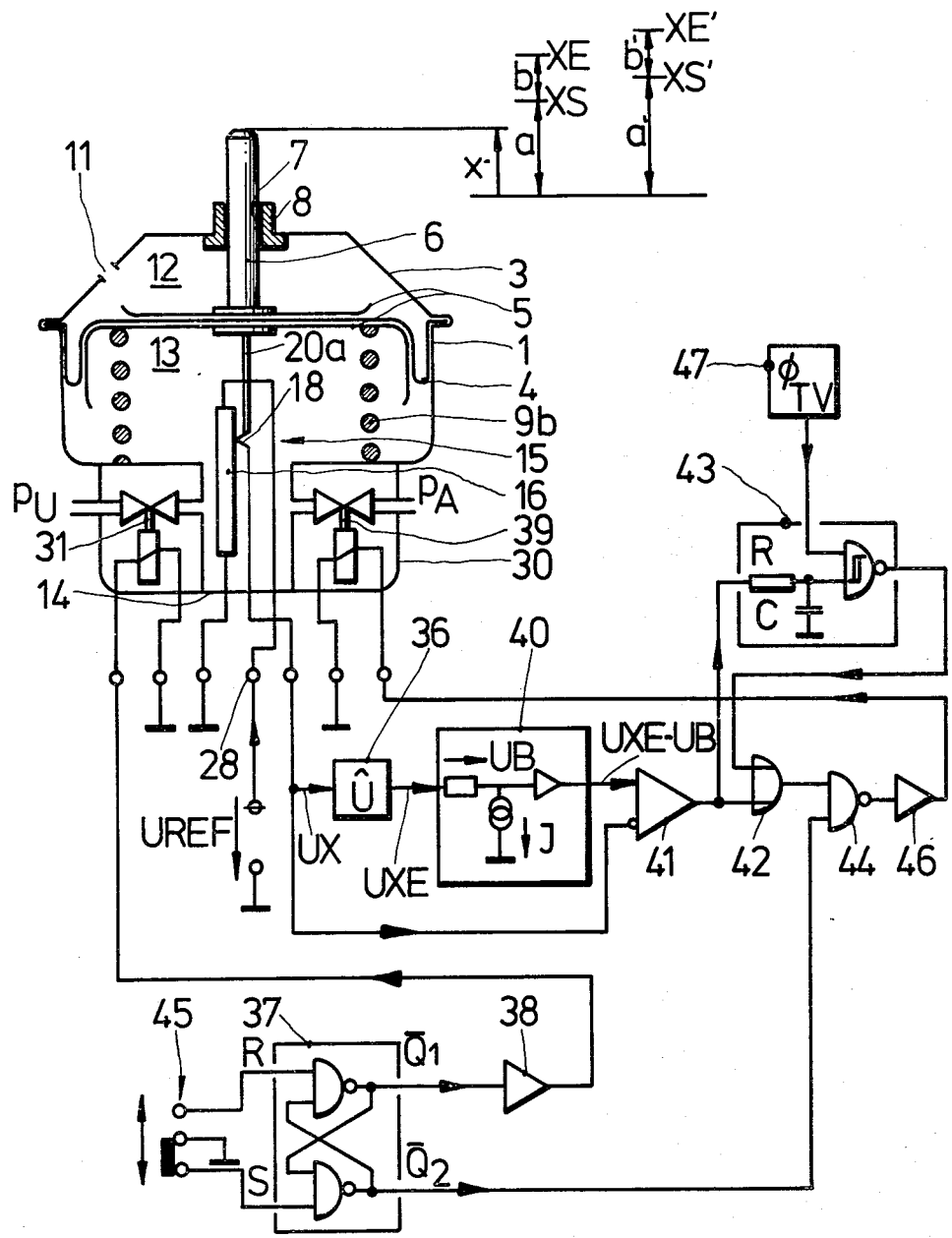

A plug contact 28 and appropriate further contacts (not shown) for the conducting strips 16 and 17 and the pick-ups 18 and 19 assure the necessary electrical connections of the monitoring device 15 to an external evaluator and control circuit which is not shown, although an example of one form of circuit is illustrated in FIG. 4.

To summarize briefly the operation of the monitoring device 15, when the operating rod 6 moves upon actuation of the servo-motor, the pick-up 18 is displaced by the plunger 20a along the conducting strip 16, and from the electrically effective length of the conducting strip 16 a signal corresponding to the actual position of the operating rod is obtained. The same applies for the limit position pick-up 19 in conjunction with the conducting strip 17, but in this case the pick-up is displaced only when a change occurs in the limit position reached by the operating rod 6 at the end of its stroke. When such limit position changes occur, the stirrup 26 displaces the slip ring 25 a corresponding amount. Ribbon potentiometers are especially suitable as the conducting strips 16 and 17.

Figure 3:
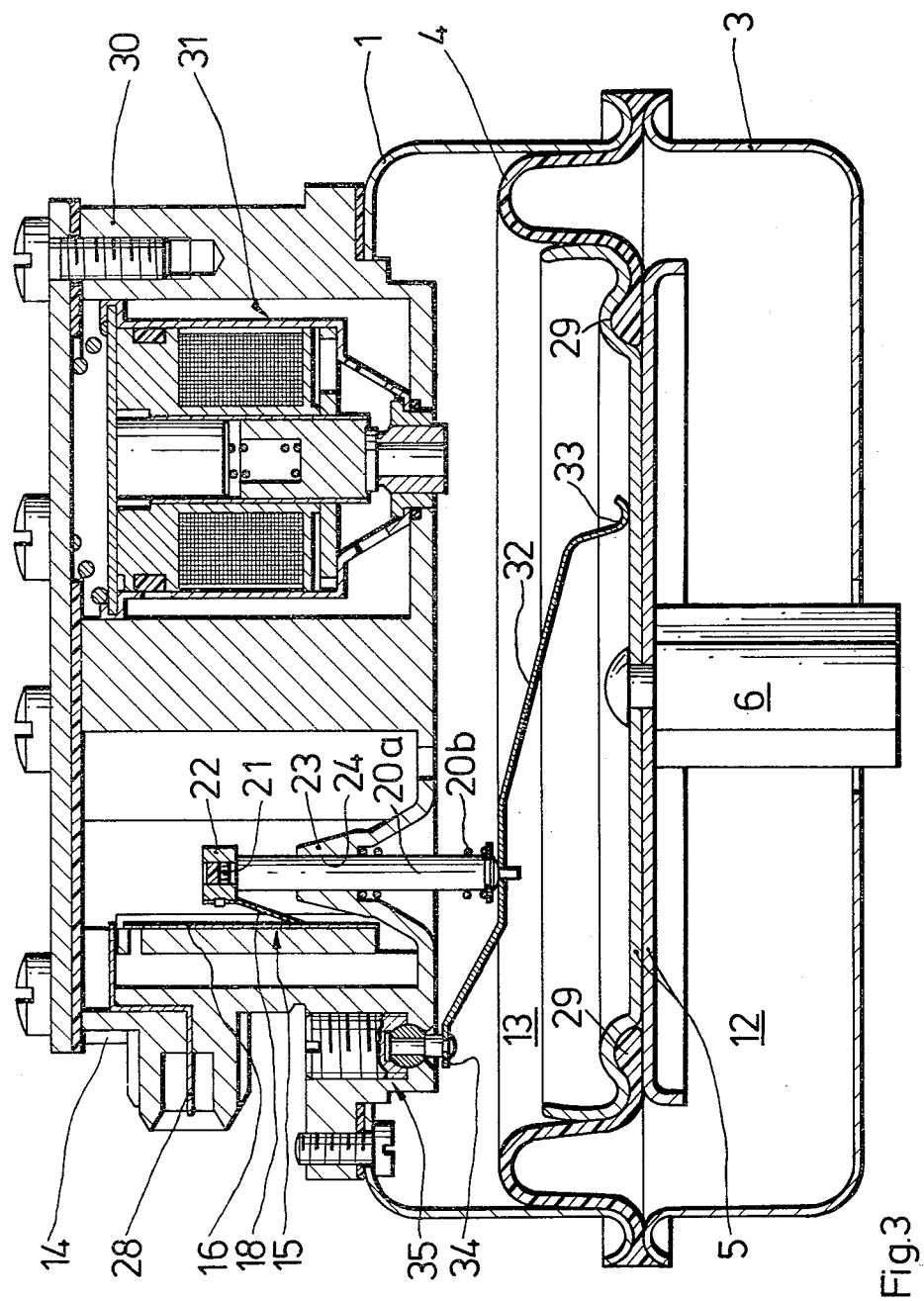
FIG. 3 is a longitudinal section through a second example of a pneumatically operated servo-motor embodying the invention; and, FIG. 4 is a diagrammatic view of a pneumatically operated servo-motor together with an electronic switching circuit for controlling the servo-motor in accordance with the method of the present invention.

In the servo-motor shown in FIG. 3, the casing 1 is sealed from the casing cover 3 directly by the diaphragm 4, and the stiffening plate 5 is sealed to the diaphragm 4 by clamping a bead 29 of the diaphragm between two parts of the plate 5. In addition, the housing 14 for the monitoring device 15 is integrally formed with a housing 30 for a conventional electromagnetic pneumatic control valve 31, and is bolted to the casing 1. In this example the plunger 20a of the monitoring device follows the movements of the operating rod 6 by means of a lever 32 which bears at one end against the stiffening plate 5 and at its other end is attached to the casing 1. The lever 32 has a curved end 33 which can slide over the stiffening plate 5 when changes occur in the position of the operating rod 6, and its other end 34 can be adjusted into an accurate position by means of an adjacent mechanism 35. The plunger 20a is biassed into permanent contact with the lever 32 between its ends 33 and 34 by the spring 20b.

The operation and control of a servo-motor in accordance with the invention to actuate a clutch will now be described with reference to FIG. 4, in which X denotes the current position of the operating rod 6. The position XS represents the position of the rod 6 at which the clutch friction surfaces touch each other without force, and from this position onwards engagement takes place with increasing force over the distance b to a limit position XE. Disengagement is effected in the opposite direction, and in the declutched state the clutch friction surfaces are separated from each other by the distance a. In order to produce clutch engagement rapidly but nevertheless gently, the distance a should be travelled through as quickly as possible and the distance b at a substantially slower speed.

In the engaged state of the clutch, the spring 9b (corresponding to the spring 9a in FIG. 1) can extend the operating rod 6 as far as the position XE when the clutch is still new and unworn. With increasing wear of the clutch friction surfaces however, the position XS of initial contact between these surfaces displaces towards XS', and the limit position towards XE'. The position XS' therefore characterises the wear condition of the clutch, which is expressed by the increase from a to a' in the distance between the clutch friction surfaces when disengaged.

The monitoring device 15 supplies a voltage signal UX proportional to the position X of the rod 6, and a limit position signal UXE or UXE' established when the clutch is fully engaged is supplied to a peak value memory 36. In the limit position (XE, XE') the pneumatic valve 31 is closed, the output $Q_1$ of a flip-flop 37 supplying a zero signal so that a succeeding driver stage 38 for the valve 31 is not activated. In addition, a further pneumatic valve 39 is de-energized open, so that both the air space 12 and also the working chamber 13 are subjected to ambient pressure.

In a summation stage 40 connected behind the peak value memory 36, a value UB corresponding to the distance b is subtracted from the peak value signal UXE, and the resulting difference signal (UXE−UB) is supplied to the non-inverting input of a comparator 41. The output signal from the comparator 41 is zero so long as the actual position signal UX, which is supplied to the inverting input, is greater than the difference signal (UXE−UB). The zero signal from the comparator 41 cannot pass through the succeeding OR-gate 42. If, however, the zero signal is inverted by a time limiter 43 and now passes as a 1-signal via a second input to the OR-gate 42, then it reaches the input of a succeeding NAND-gate 44. The other input of the NAND-gate 44 likewise receives a 1-signal from the output $Q_2$ of the flip-flop 37, so long as a selector switch 45 of the flip-flop has its S-input set to zero. Because both the inputs of the NAND-gate 44 now receive a 1-signal, the output of this gate supplies an 0-signal to a succeeding driver stage 46, which accordingly is not activated, and as a result the pneumatic valve 39 remains de-energized, that is open.

To release the clutch, the selector switch 45 of the flip-flop 37 is set in the upper position to earth the R-input of the flip-flop 37. This switches the latter over so that its output $Q_1$ now supplies a 1-signal, which activates the driver stage 38 to open the pneumatic valve 31. In consequence a vacuum PU is connected to the working chamber 13 of the servo-motor and the operating rod is actuated to disengage the clutch friction surfaces. The $Q_2$ output of flip-flop 37 correspondingly supplies a 0-signal, which is inverted by the NAND-gate 44 and as a 1-signal activates the driver stage 46 so that the pneumatic valve 39 closes.

Re-engagement of the clutch is effected by switching over the selector switch 45 of the flip-flop 37 to the lower position. Consequently, the $Q_1$-output supplies an 0-signal so that the driver stage 38 is not activated and the pneumatic valve 31 is closed, and the $Q_2$ output supplies a 1-signal to the NAND-gate 44. While the distance X is smaller than the distance a, on account of the proportionality of the voltage signals the value UX is also smaller than (UXE−UB), and the output of the comparator 41 continues to supply a 1-signal which passes via the OR-gate 42 to the corresponding input of the NAND-gate 44. Accordingly the gate 44 delivers a 0-signal to the driver stage 46, which is therefore not activated and the pneumatic valve 39 is de-energized and opened. Air at ambient pressure PA flows into the working chamber 13, which allows the operating rod 6 to travel under the action of its spring 9b, the distance X rapidly increasing.

At the position X=XS, the difference signal (UXE−UB) is equal to the position signal UX. Thus the switch-over point for the comparator 41 is reached, so that its output switches to zero. Thereupon the time limiter 43 becomes active, and in such a manner that a timing pulse generator 47 associated with it cyclically actuates the pneumatic valve 39 until the time limiter receives the 0-signal of the comparator 41 via the integrated RC delay circuit. As a result of the cyclical actuation, the average rate of air flow into the chamber 13 through the pneumatic valve 39 is reduced and the rod 6 travels through the distance b more slowly than through the distance a. After the limit position XE has been reached and the time constant in the time limiter 43 has expired, the cyclical actuation ends and the pneumatic valve 39 remains de-energized and open. Unnecessary wear by further cyclical action is thus avoided.

As mentioned earlier, the gradual wear of the clutch friction surfaces has the result that the position XE displaces towards XE'. On each displacement a corresponding voltage signal is recorded by the peak valve memory 36 and in the succeeding engagement operations, the comparator 41 initiates the creeping movement at a slightly later position related to the newly established limit position. By this measure, only the distance b, which is the constant zone of the clutch and is always of constant magnitude, is travelled through slowly, even when wear at the clutch friction surfaces has occurred and the air gap between them has become larger.

I claim:

1. A method of controlling a pneumatically operated servo-motor having an operating rod with a substantially linear stroke and a pneumatic chamber for actuating said operating rod according the pressure in said chamber, said method comprising the steps of continuously monitoring the actual position of said operating rod during each stroke thereof, recording a limit position reached by said operating rod in each stroke, and modifying the speed at which said operating rod travels towards said limit position of said stroke during each stroke when said operating rod reaches a position which lies a predetermined amount in front of said limit position reached during the preceding stroke.

2. A method as claimed in claim 1, wherein said step of continuously monitoring the actual position of said operating rod during each stroke includes causing a first pick-up to move with movement of said rod, said step of recording said limit position of each stroke comprises monitoring the position of a second pick-up mounted to move in response to any change in the limit position from one stroke to the next, and said position from which the velocity of said operating rod is modified during each stroke corresponds to a fixed difference between the positions of said first and second pick-ups.

3. A method as claimed in claim 1, wherein said step of continuously monitoring the actual position of said operating rod during each stroke includes providing an electrical voltage signal representative of said actual position at any instant, and said step of recording said limit position includes storing an electrical voltage signal corresponding to said limit position in a signal holding circuit for the next stroke.

4. A method as claimed in claim 2, including the step of deriving an electrical voltage signal from said first pick-up corresponding to the actual position of said operating rod, deriving an electrical voltage signal from said second pick-up corresponding to said limit position of each stroke, and storing said electrical voltage signal from said second pick-up in a signal holding circuit for the duration of the next stroke.

5. A method as claimed in claim 1, wherein the step of modifying the velocity of said operating rod comprises cyclically pressure-loading said pneumatic chamber of said servo-motor.

6. A method as claimed in claim 5, wherein said pneumatic chamber includes a control valve, and said step of cyclically pressure-loading said pneumatic chamber comprises the steps of opening and closing said control valve and varying the ratio of said opening and closing times of said valve as a function of the degree of proximity of said operating rod to said limit position reached during the preceding stroke.

7. A method as claimed in claim 6, wherein the ratio of said opening and closing times of said control valve is varied whereby the velocity of said operating rod is modified by initially reducing it to a predetermined minimum value and then again increasing it with increasing proximity of said rod to said limit position.

8. A pneumatically operated servo-motor of the kind having an operating rod with a substantially linear stroke and a pneumatic chamber for actuating said operating rod according to the pressure in said chamber, said servo-motor including a device for continuously monitoring the actual position of said operating rod during each stroke, said device including a pick-up mounted to move with movement of said operating rod, means for recording a limit position reached by said operating rod in each stroke, and means for modifying during each stroke the speed at which said operating rod travels towards said limit position commencing from a position of said rod which lies a predetermined amount in front of said limit position reached during the preceding stroke.

9. A servo-motor as claimed in claim 8, wherein said means for recording said limit position reached by said operating rod in each stroke includes a second pick-up which is mounted to move in response to a change in said limit position from one stroke to the next.

10. A servo-motor as claimed in claim 7, including means for generating electrical voltage signals representative of said actual and said limit positions reached by said operating rod during each stroke, and said means for recording said limit position includes a holding circuit for storing said electrical signal generated in response to said limit position for use in the succeeding stroke.

11. A servo-motor according to claim 10, wherein said device for monitoring the actual position of said operating rod during each stroke includes a ribbon potentiometer extending parallel to the direction of said stroke, said pick-up which moves with movement of said operating rod being in sliding engagement with said ribbon potentiometer.

* * * * *